United States Patent Office 3,328,388
Patented June 27, 1967

3,328,388
ARABINOFURANOSYL PYRIMIDINES AND METHODS OF PREPARING SAME
Tsung-Ying Shen, Westfield, and William V. Ruyle, Scotch Plains, N.J., assignors to Merck & Co., Inc., Rahway, N.J., a corporation of New Jersey
No Drawing. Filed Sept. 2, 1964, Ser. No. 394,054
19 Claims. (Cl. 260—211.5)

This invention relates to novel processes for the preparation of arabinofuranosyl pyrimidines and more particularly to stereospecific processes for obtaining such pyrimidines. Specifically, it relates to the preparation, by novel processes, of 1-β-D-arabinofuranosyl pyrimidines, some of which pyrimidines are novel, and the production of certain novel intermediates used in such processes.

Much interest has been generated recently in arabinofuranosyl pyrimidines in view of the discovery that they possess chemotherapeutic utility. Specifically, and with particular reference to cytosine arabinoside, they have been found to possess selective antiviral activity against DNA viruses such as herpes keratitis and vaccinia.

Conventionally, the synthesis of pyrimidine arabinonucleosides has involved multi-step conversions from the corresponding ribofuranosyl nucleosides, generally by way of the cyclonucleoside route. Such routes, however, have not been entirely satisfactory in that the yields obtained were often low and the syntheses themselves required much effort. It has therefore become desirable to provide new syntheses for producing such compounds which may be carried out economically and conveniently from available starting materials.

It is an object of the present invention to provide novel processes for the preparation of arabinofuranosyl pyrimidines. Another object is to provide a process for the preparation of arabinofuranosyl pyrimidines in the β configuration. Yet aonther object is to provide an overall process for obtaining a variety of arabinofuranosyl pyrimidines in the β configuration. Still another object is to provide certain novel 1-β-D-arabinofuranosyl pyrimidines. Yet a further object is to provide certain novel intermediates useful in the preparation of 1-β-D-arabinofuranosyl pyrimidines.

It has now been discovered that arabinofuranosyl pyrimidines can be prepared in a general process which involves the condensation of pyrimidine compounds with a halo substituted arabinofuranoside according to the following general flow diagram.

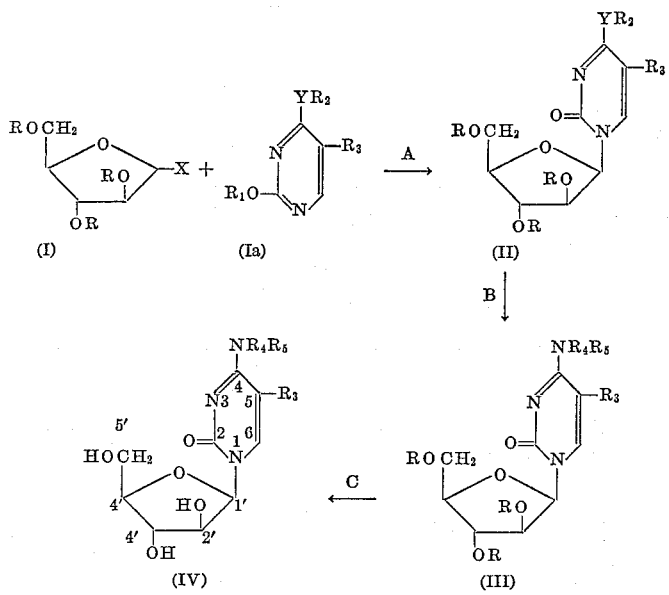

wherein R is an aralkyl group, either substituted or unsubstituted, such as benzyl and substituted benzyl such as alkylbenzyl, halobenzyl, alkoxybenzyl, nitrobenzyl and the like, $R_1$ and $R_2$ are alkyl, $R_3$ is hydrogen, alkyl, halogen such as fluoro, chloro or bromo, or halogenated alkyl such as trifluoromethyl, X is a halogen such as chloro or bromo, Y is oxygen or sulfur, and $R_4$ and $R_5$ are hydrogen or alkyl.

As can be seen from the foregoing flow diagram, the process of the present invention involves condensing a haloarabinofuranoside with an appropriate pyrimidine, under certain conditions, to form Compounds II which are generally designated as 1-(2′,3′,5′-tri-O-aralkyl-β-D-arabinofuranosyl)-4-substituted-2(1H)-pyrimidinones. It will be noted that this step also effects the conversion of the 2-alkoxy group of the pyrimidine to the 2-keto group. Compounds II are treated to convert the 4-alkoxy or 4-alkylthio group to an amino or substituted amino group by amination at an elevated temperature with an appropriate amine and subsequently hydrogenating the aminated compound, as more specifically shown hereinafter, to remove the 2′, 3′, and 5′ aralkyl groups thus resulting in a 1-β-D-arabinofuranosyl pyrimidine.

Referring now to the individually designated steps in the foregoing flow diagram, there is employed as Compound I, 2,3,5-tri-O-aralkyl-D-arabinofuranosyl halide such as the chloride or bromide with the chloride being preferred (hereafter sometimes referred to as halo sugar, chloro sugar or bromo sugar), in reaction with the substituted pyrimidine (Ia). The halo sugar is in the D configuration with respect to the 4-carbon atom.

The conditions employed in Step A are critical in effecting a high yield of the pyrimidinone. Thus, the reaction requires that the reactants be condensed in the presence of a solvent and at a temperature of between 0 and 70° C. The preferred operating temperature is from 15–40° C. The amounts of reactants are not critical, but it is preferred to use an excess of the pyrimidine. As solvents there may be employed any solvent which is inert to the system as represented by halogenated aliphatic solvents such as methylene chloride and ethylene chloride; hydrocarbons such as hexane, cyclohexane, and heptane; aromatic solvents such as benzene, toluene, and xylene; ethers such as 1,2-dimethoxyethane, tetrahydrofuran, and diethyl ether; and esters such as ethyl acetate, amides such as dimethylformamide, and the like. It is preferred to use the halogenated aliphatic solvents, with methylene chloride being most preferred. The reaction is allowed to proceed and when run at lower temperatures, around room temperature, is generally complete in from 24–96 hours. Thereafter, the reaction mass is submitted to vacuum treatment to remove residual solvent and the residue used directly in the next step, B, if desired, without further purification or treatment. When the reaction is carried out as described, yields of pyrimidinone approaching quantitative are obtained in the condensation step. As pyrimidine reactants there may be employed 2,4-dimethoxy pyrimidine, 2-methoxy-4- methylthio pyrimidine, 2,4-diethoxy pyrimidine, 2 - ethoxy - 4 - ethylthio pyrimidine, 2,4-dimethoxy-5-trifluoromethyl pyrimidine, 2,4 - dimethoxy-5-fluoro pyrimidine, 2,4 - dimethoxy-5-methyl pyrimidine, 2-methoxy-4-methylthio-5-trifluoromethyl pyrimidine, and the like, with 2,4-dimethoxy, 2,4-dimethoxy - 5 - trifluoromethyl, 2-methoxy-4-methylthio, and 2-methoxy-4-methylthio-5-trifluoromethyl pyrimidine being preferred. Illustrative of the halo sugars which may be employed are 2,3,5-tri-O-benzyl-D-arabinofuranosyl chloride, 2,3,5-tri-O-benzyl-D-arabinofuranosyl bromide, 2,3,5-tri-O-p-methylbenzyl-D-arabinofuranosyl chloride, 2,3,5 - tri-O-p-chlorobenzyl-D-arabinofuranosyl chloride, and the like, with the tri-O-benzyl chloride being preferred.

Step A of the process yields, as indicated above, pyrimidinones substituted in the 2′, 3′, and 5′ positions with the aralkyl radical corresponding to that present in the arabinoside and the appropriate substituents in the 4- and 5-position. When $R_3$ is alkyl, halogen, or halogenated alkyl, Compounds II are novel. The condensation between the halo sugar and the pyrimidine takes place at the one carbon atom of the halo sugar and the 1–N atom of the pyrimidine and in the β configuration such that the 1′ RO group of the halo sugar is cis to the pyrimidinone moiety. Furthermore, the alkoxy group originally present at the 2-position of the pyrimidine reactant is converted to a keto group giving the pyrimidinone radical.

Representative of the compounds which are obtained according to Step A of the process are 1-(2′,3′,5′-tri-O-benzyl - β - D-arabinofuranosyl)-4-methoxy-2(1H)-pyrimidinone, 1 - (2′,3′,5′-tri-O-benzyl-β-D-arabinofuranosyl)-4-methylthio-2(1H)-pyrimidinone, 1-(2′,3′,5′-tri-O-benzyl - β-D-arabinofuranosyl)-4-methylthio-5-trifluoromethyl-2(1H)-pyrimidinone, 1-(2′,3′,5′-tri-O-benzyl-β-D-arabinofuranosyl) - 4-methoxy-5-trifluoromethyl-2(1H)-pyrimidinone, 1-(2′,3′,5′-tri-O-benzyl-β-D-arabinofuranosyl)-4-methoxy-5-fluoro-2(1H)-pyrimidinone, 1-(2′,3′,5′-tri-O-benzyl-β-D-arabinofuranosyl) - 4 - methylthio-5-fluoro - 2(1H) - pyrimidinone, 1-(2′,3′,5′-tri-O-benzyl-β-D-arabinofuranosyl)-4-methoxy-5-methyl - 2(1H) - pyrimidinone, and the like, with the preferred compounds being 1 - (2′,3′,5′-tri-O-benzyl-β-D-arabinofuranosyl)-4-methoxy-5-trifluoromethyl-2(1H)-pyrimidinone, 1-(2′,3′, 5′ - tri-O-benzyl-β-D-arabinofuranosyl)-4-methylthio - 5-trifluoromethyl-2-(1H)-pyrimidinone, 1 - (2′,3′,5′-tri-O-benzyl-β-D-arabinofuranosyl)-4-methoxy - 2(1H)-pyrimidinone, and 1-(2′,3′,5′-tri-O-benzyl-β-D-arabinofuranosyl)-4-methylthio-2(1H)-pyrimidinone.

Step B of the process involves aminating Compounds II to convert the 4-substituent thereof to an amino or a substituted amino group by amination with ammonia or ammonium hydroxide or a primary or secondary amine as is appropriate, and under pressure to obtain Compounds III which are novel when $R_3$ is alkyl, hlaogen, or halogenated alkyl. The reaction is carried out at elevated temperatures, temperatures within the range of from 50–125° C. being suitable. There is a time-temperature relationship for the reaction for which at the lower temperatures periods of from 2–3 days are required for essentially complete reaction. However, it is preferred to run the reaction at temperatures of from between 80–110° C. for which the reaction is complete in periods ranging from 10–0 hours. The pressure for the reaction is that generated by the reactants and solvent system being used at the temperature employed. Thus, the system is maintained in a closed vessel to allow this pressure to build up. The reaction is preferably carried out in the presence of an inert solvent such as lower alkanols, exemplified by methanol, ethanol, butanol, and the like; ethers such as tetrahydrofuran and dimethyl ether; and liquid hydrocarbons such as hexane, octane, and the like. The preferred solvents are the lower alkanols with methanol most preferred. It has further been discovered that when the reaction with ammonia is carried out on compounds II wherein $R_3$ is trifluoromethyl, there is surprisingly obtained, in addition to the 5-trifluoromethyl, 4-aminated arabinoside, another compound which is itself novel and shown by elemental analysis and ultraviolet and infrared data to be the 5-cyano derivative. Thus, reaction at the 5-trifluoromethyl group is effected resulting in the conversion of that group to the cyano group. These compounds may be separated from the 5-trifluoromethyl compound by repeated fractional crystallization from methanol and/or isopropanol or benzene solutions.

When $R_4$ and $R_5$ are hydrogen, the aminating agent is liquid ammonia or ammonium hydroxide. Where either of $R_4$ or $R_5$ is an alkyl radical, a primary amine having the appropriate alkyl radical such as methylamine, ethylamine, propylamine, and the like, is used as the aminating agent and where both $R_4$ and $R_5$ are alkyl radicals, a secondary amine having the appropriate alkyl radicals such as dimethylamine, diethylamine, and dipropylamine is used. Where higher alkyl radicals are desired, the appropriate aminating agent will be employed. With regard to amounts of materials employed, it is preferred to use an excess of the aminating agent. At the conclusion of the reaction, the aminated product is recovered from the reaction mixture by any conventional means and used in Step C of the process. Representative of the compounds that are obtained as a result of carrying out Step B are 1-(2′,3′,5′-tri-O-benzyl-β-D-arabinofuranosyl)-4-amino-2(1H)-pyrimidinone, also described as
1-(2′,3′,5′-tri-O-benzyl-β-D-arabinofuranosyl)-cytosine,
1-(2′,3′,5′-tri-O-benzyl-β-D-arabinofuranosyl)-4-amino-5-cyano-2(1H)-pyrimidinone,
1-(2′,3′,5′-tri-O-benzyl-β-D-arabinofuranosyl)-4-methylamino-2(1H)-pyrimidinone,
1-(2′,3′,5′-tri-O-benzyl-β-D-arabinofuranosyl)-4-ethylamino-2(1H)-pyrimidinone,
1-(2′,3′,5′-tri-O-benzyl-β-D-arabinofuranosyl)-4-dimethylamino-2(1H)-pyrimidinone,
1-(2′,3′,5′-tri-O-benzyl-β-D-arabinofuranosyl)-4-diethylamino-2(1H)-pyrimidinone,
1-(2′,3′,5′-tri-O-benzyl-β-D-arabinofuranosyl)-4-amino-5-trifluoromethyl-2(1H)-pyrimidinone,
1-(2′,3′,5′-tri-O-benzyl-β-D-arabinofuranosyl)-4-amino-5-methyl-2(1H)-pyrimidinone, 1-(2′,3′,5′-tri-O-benzyl-β-D-arabinofuranosyl)-4-amino-5-fluoro-2(1H)-pyrimidinone,
1-(2′,3′,5′-tri-O-benzyl-β-D-arabinofuranosyl)-4-methylamino-5-trifluoromethyl-2(1H)-pyrimidinone,
1-(2′,3′,5′-tri-O-benzyl-β-D-arabinofuranosyl)-4-dimethylamino-5-trifluoromethyl-2(1H)-pyrimidinone,
1-(2′,3′,5′-tri-O-benzyl-β-D-arabinofuranosyl)-4-ethylamino-5-trifluoromethyl-2(1H)-pyrimidinone, and
1-(2′,3′,5′-tri-O-benzyl-β-D-arabinofuranosyl)-4-diethylamino-5-trifluoromethyl-2(1H)-pyrimidinone.

Step C of the process involves treating Compounds III to remove the 2′,3′,5′ aralkyl radicals by hydrogenolysis in the presence of a solvent and a catalyst to obtain Compounds IV which are novel when the 5-substituent is alkyl, halogen, halogenated alkyl such as trifluoromethyl or cyano and possess antiviral and antibacterial activity. As catalysts there may be employed platinum, nickel, and palladium, with palladium preferred. The palladium catalyst is conveniently formed in the same reaction vessel used for the hydrogenation by reducing a palladium compound precursor, such as palladium chloride, in the same solvent system as employed for the hydrogenation. Thereafter Compounds II are added to the system and then contacted with hydrogen. As suitable solvents there may be employed lower alkanols such as methanol, ethanol, butanol, and the like; ethers such as dimethyl ether, tetrahydrofuran, dimethoxyethane; acids such as acetic acid. Lower alkanols are preferred, with methanol being most preferred. The reaction is conveniently run at room temperature, which is preferred, although temperatures not detrimental to the stability of the system may be employed, and at atmospheric or slightly above atmospheric pressures. The reaction is normally complete in a short time of the order of 10 or 15 minutes to one hour, after which the catalyst is filtered off and the filtrate subjected to a vacuum to remove the solvent therefrom. During the course of the in situ formation of the palladium catalyst from palladium chloride, the reaction medium becomes acidic due to the formation of hydrogen chloride and induces the formation of the hydrochloride salt of the final product at the amino or substituted amino group in the 4-position. Therefore, it is desirable to neutralize the solution with a base or an ion exchange resin or like material before isolation of the product. At this point, the neutral solution is concentrated and the product recovered and treated to remove impurities by means well known in the art. This step of the process is effective to produce the final arabinoside pyrimidine by causing the removal of the 2′,3′,5′ aralkyl substituent. Overall yields of final product normally range from 50 to 65%. Typical of the compounds obtained are 1-β-D-arabinofuranosyl - 4 - amino-2(1H)-pyrimidinone, otherwise generally known as cytosine arabinoside,
1-β-D-arabinofuranosyl-4-methylamino-2(1H)-pyrimidinone,
1-β-D-arabinofuranosyl-4-dimethylamino-2(1H)-pyrimidinone,
1-β-D-arabinofuranosyl-4-amino-5-trifluoromethyl-2(1H)-pyrimidinone,
1-β-D-arabinofuranosyl-4-amino-5-cyano-2(1H)-pyrimidinone,
1-β-D-arabinofuranosyl-4-amino-5-fluoro-2(1H)-pyrimidinone,
1-β-D-arabinofuranosyl-4-amino-5-methyl-2(1H)-pyrimidinone,
1-β-D-arabinofuranosyl-4-methylamino-5-trifluoromethyl-2(1H)-pyrimidinone,
1-β-D-arabinofuranosyl-4-methylamino-5-fluoro-2(1H)-pyrimidinone,
1-β-D-arabinofuranosyl-4-methylamino-5-methyl-2(1H)-pyrimidinone,
1-β-D-arabinofuranosyl-4-dimethylamino-5-trifluoromethyl-2(1H)-pyrimidinone,
1-β-D-arabinofuranosyl-4-dimethylamino-5-fluoro-2(1H)-pyrimidinone, and
1-β-D-arabinofuranosyl-4-dimethylamino-5-methyl-2(1H)-pyrimidinone.

As can be seen from the description of the foregoing embodiment of the present invention, the overall process results in cytosine arabinoside and derivatives thereof. Alternatively, Step B can be by-passed. Compounds II can be hydrolyzed to convert the 4-alkoxy or 4-alkylthio substituent to the keto group to produce, with subsequent hydrogenolysis, uracil arabinosides and derivatives thereof. Structurally this embodiment is depicted as follows:

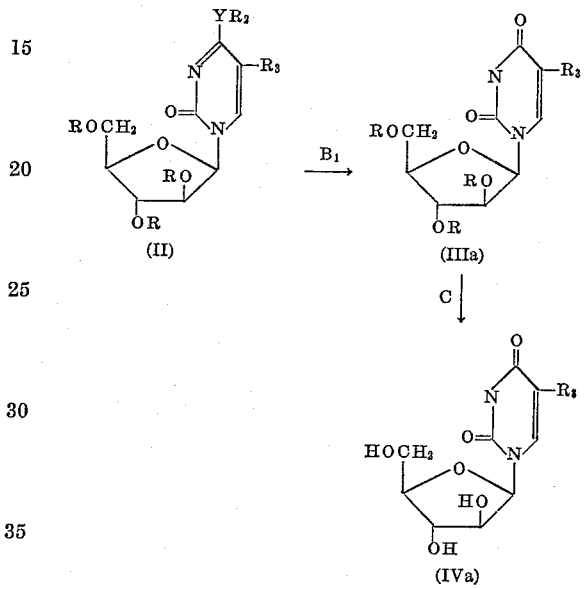

In general, Step B involves treating Compounds III to hydrolyze the 4-alkylthio or alkoxy group to the keto group. This may be done by contacting the compounds with a mineral acid such as hydrobromic, hydrochloric, and sulfuric. A convenient mode of operation is to use aqueous acid and, if desired, an additional solvent such as a lower alkanol. Temperatures between room temperature and the reflux temperature are suitable. Representative of Compounds IIIa obtained according to this alternate step are 1 - (2′,3′,5′ - tri-O-benzyl - β - D - arabinofuranosyl) - 4 - oxo-pyrimidinone (otherwise conveniently termed 1 - (2′,3′,5′ - tri-O-benzyl-β-D-arabinofuranosyl)-uracil), 1-(2′,3′,5′ - tri-O-benzyl-β-D-arabinofuranosyl)- 4 - oxo - 5 - trifluoromethyl-pyrimidinone, 1-(2′,3′,5′-tri-O-benzyl - β - D-arabinofuranosyl)-5-fluoro-pyrimidinone, 1-(2′,3′,5′-tri-O-benzyl-β-D-arabinofuranosyl)-5 - methyl-pyrimidinone, and the like. These compounds are then converted into Compounds IVa by treating them according to the process described in Step C above to effect the removal of the 2′,3′,5′ aralkyl substituents and produce compounds of the uracil arabinoside class. The sequence of Steps B₁ and C may be reversed if desired in which case R in IIIa would be hydrogen and the 4-YR₂ group of II would remain unchanged until B₁ were performed. Typical of such compounds are 1-β-D-arabinofuranosyl-4-oxo-pyrimidinone (also termed uracil arabinoside), 1 - β - D - arabinofuranosyl-4-oxo-5-trifluoromethyl-pyrimidinone, 1 - β - D-arabinofuranosyl-4-oxo-5-fluoro-pyrimidinone, and 1-β-D-arabinofuranosyl-4-oxo-5-methyl-pyrimidinone.

In accordance with an additional embodiment of the present invention, Compounds III wherein R₄ and R₅ are hydrogen are also obtained by condensing the halo sugar reactant of Step A and a mercury complex of an N-acetyl cytosine (N-acetyl-4-amino-5R₃-2(1H)-pyrimidinone) in a high temperature reaction, preferably under refluxing conditions in the presence of a solvent and subsequent treatment of the condensed product with a base to effect the removal of the 4-N-acetyl group. The following flow diagram illustrates this conversion.

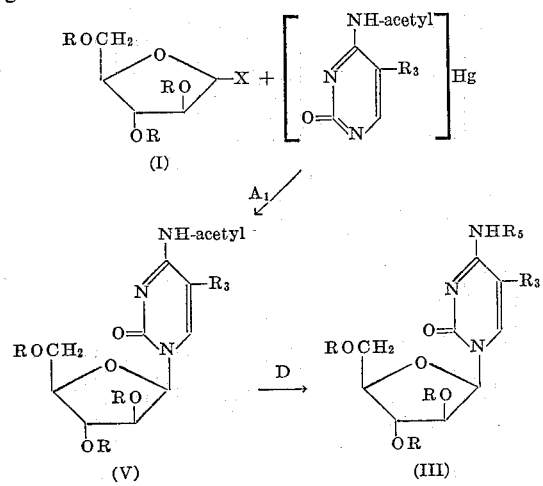

In Step $A_1$, in general, such solvents as aromatic solvents exemplified by toluene, xylene, benzene, and the like, as well as aliphatic solvents such as heptane, octane, and the like may be employed. Reaction temperatures may suitably range from 0° C. to 100° C. with the refluxing temperature of the particular solvent system employed being preferred, although the actual conditions are not critical. At the conclusion of the reaction, which under refluxing conditions normally takes place in from 10 minutes to one hour, the product is obtained in solution. Crystallization is difficult to effect and it is preferred to strip the reaction mixture of solvent by vacuum treatment and the product removed by extraction in a solvent such as chloroform. As a result of this step, the condensation between the mercury complex of N-acetyl cytosine and the halo sugar is effected and yields compounds designated generally as 4-N-acetyl-5$R_3$-1-(2′,3′,5′-tri-O-aralkyl-β-D-arabinofuranosyl)-cytosine, designated herein as Compounds V. Illustrative of other products obtained by this step are the following: 4 - N - acetyl-5-trifluoromethyl - 1 - (2′,3′,5′ - tri - O - aralkyl - β - D - arabinofuranosyl)-cytosine, 4 - N-acetyl-5-fluoro-1-(2′,3′,5′-tri-O-aralkyl-β-D-arabinofuranosyl)-cytosine, and 4 - N-acetyl-5 - methyl-1-(2′,3′,5′-tri-O-aralkyl-β-D-arabinofuranosyl)-cytosine.

Compounds V are then converted in Step D to Compounds III by treating with a suitable base to effect the removal of the acetyl radical from the 4-N-position. The temperature of the reaction is elevated with suitable results being obtained between 50 and 100° C. and temperatures between 65 and 90° C. being preferred. As bases there may be employed any suitable base stronger than sodium carbonate such as sodium hydroxide, potassium hydroxide, organic bases such as benzyl trimethyl ammonium hydroxide and the like. The hydrolysis is desirably carried out in the presence of solvent such as lower alkanol, exemplified by methanol, ethanol, butanol, and ethers such as tetrahydrofuran, dioxane, dimethoxy ethane, and the like.

At the conclusion of the reaction the product is obtained in solution and may be extracted into a suitable solvent such as chloroform and subsequently treated in accordance with Step C above disclosed to obtain Compounds IV wherein $R_4$ and $R_5$ are hydrogen.

According to a further embodiment of the present invention, Compounds III are obtained by reacting the halo sugar, preferably in the presence of a solvent, with an alkali metal derivative of 4-alkylthio or alkoxy-pyrimidine-2-one such as is obtained by treatment of the pyrimidine with sodium hydride, potassium hydride, sodamide, methyllithium, and the like. The preferred starting material is the methylthio compound. It is preferred to form the alkali metal derivative in situ by combining a mixture of the pyrimidine, the halo sugar, and the appropriate alkali metal hydride and reacting them simultaneously. The flow diagram presented below shows the general scheme of the reaction.

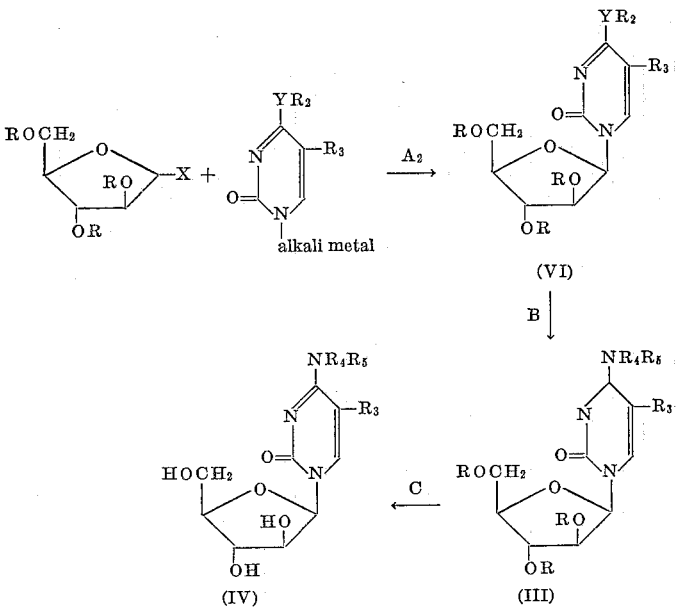

The temperature of the reaction is not critical and room temperature is preferred. Operating ranges are suitably between 0° and 50° C., depending on which solvent system is used, when one is employed. As solvents there may be mentioned dimethylformamide, tetrahydrofuran, dimethoxy ethane, benzene, toluene, xylene, and the like. The condensation reaction is effective to produce compounds designated generally as 1-(2′,3′,5′-tri-O-aralkyl-β-D-arabinosyl)-4-alkylthio or alkoxy-5$R_3$ - pyrimidinone, Compounds VI. Illustrative of these are the following:

1-(2′,3′,5′-tri-O-benzyl-β-D-arabinosyl)-4-methylthiopyrimidinone, 1-(2′,3′,5′-tri-O-benzyl-β-D-arabinosyl)-4-methoxypyrimidinone, 1-(2′,3′,5′-tri-O-benzyl-β-D-arabinosyl)-4-methylthio-5-trifluoromethyl-pyrimidinone, 1-(2',3',5'-tri-O-benzyl-β-D-arabinosyl)-4-methoxy-5-trifluoromethyl-pyrimidinone,
1-(2',3',5'-tri-O-benzyl-β-D-arabinosyl)-4-methylthio-5-fluoro-pyrimidinone, and
1-(2',3',5'-tri-O-benzyl-β-D-arabinosyl)-4-methylthio-5-methyl-pyrimidinone.

These compounds may then be converted into Compounds III in accordance with the teaching of Step B above referred to to remove the alkylthio or alkoxy group and obtain the amino or substituted amino at the 4-position. Compounds IV may then be prepared from Compounds III in accordance with Step C as above described.

Compounds Ia wherein $R_3$ is halogen, alkyl, or halogenated alkyl such as trifluoromethyl, are novel and may be prepared in a variety of ways. Preferably, the appropriately 5-substituted uracil is selected as a starting material. The 5-trifluoromethyl, 5-fluoro, and 5-methyl uracils are known and the other corresponding halogen or alkyl substituted uracils which may be unknown are prepared according to the methods used for preparing the known materials using the appropriate halogen or alkyl reagents in place of the fluoro or methyl reagents. These 5-substituted uracils are treated to convert the 2,4-diketo groups to 2,4-dihalo groups using preferably phosphorous oxychloride or phosphorous pentachloride. The resulting compound is then treated with the appropriate alkali metal alkoxide to convert the 2,4-dichloro groups to 2-$R_1$O and 4-$R_2$Y groups where Y is oxygen, yielding Compounds Ia.

When Y in 4-$R_2$Y is sulfur, Compounds Ia are likewise prepared from the appropriate 5-substituted uracil as above by treating the uracil with phosphorous oxychloride or pentachloride and then treating the resulting 2,4-dihalo compound with one mole of a salt of methylmercaptan per mole of dihalo compound to preferentially convert the 4-chloro group to the 4-S group. This compound is then treated as above with the appropriate alkoxide to obtain the 2-alkoxy-4-alkylthio-5-substituted-pyrimidine. Care should be taken to avoid vigorous conditions in the above conversions when $R_3$ is trifluoromethyl so as to avoid decomposing this group.

The 5-substituted pyrimidines used in Step $A_2$ when Y is sulfur is prepared by treating the appropriately 5-substituted uracil with phosphorous pentasulfide to convert the 4-keto group to 4-thione. This is then alkylated with the appropriate alkylating agent yielding the 2-keto-4-alkylthio compound which is then ready for conversion to the alkali metal derivative as previously disclosed. The 5-substituted pyrimidines used in Step $A_1$ are prepared from the 2-keto-4-alkylthio compound by treating the material first with ammonia then acetic anhydride thereby yielding the 4-N-acetyl-4-amino-5-substituted-2(1H)-pyrimidinone which is then converted to the mercury complex by known means.

The following examples are given for the purpose of illustration only and not by way of limitation.

*Example 1.—1-(2',3',5'-tri-O-benzyl-β-D-arabinofuranosyl)-4-methoxy-2(1H)-pyrimidinone (II)*

An excess of 2,4-dimethoxypyrimidine (17.36 g., 0.124 m.), dissolved in 50 ml. of dry methylene chloride, is added to 25.9 g. (0.0591 m.) of colorless 2,3,5-tri-O-benzyl-D-arabinofuranosyl chloride in 800 ml. of methylene chloride, which is dried over magnesium sulfate and filtered directly into the reaction vessel. The halo sugar is prepared from an anomeric mixture of the p-nitrobenzoyl ester of 2,3,5-tri-O-benzyl-β-D-arabinofuranose. The solution, protected by a calcium sulfate drying tube, is stirred gently at room temperature for three days.

The solvent is then removed from the faintly amber condensation product in vacuo at a bath temperature below 45° C. to form a crude mixture used in Example 2 below. A small sample of the crude mixture is adsorbed on a column of acid-washed alumina and eluted with ethyl acetate. The oily product shows $[\alpha]_D^{26}+115°$ (methylene chloride, c. 2.0)

$\lambda_{max.}^{MeOH}$ 276 mμ ($\epsilon$ 6,401, $\lambda_{min.}$ 244 mμ

*Analysis.*—Calc. for $C_{31}H_{32}O_6N_2$: C, 70.45; H, 6.10; N, 5.30. Found: C, 69.41; H, 6.08; N, 5.23.

When the foregoing procedure is repeated using in place of 2,4-dimethoxypyrimidine, equivalent amounts of 2-methoxy-4-methylthiopyrimidine,
2,4-dimethoxy-5-trifluoromethylpyrimidine,
2-methoxy-4-methylthio-5-trifluoromethylpyrimidine,
2,4-dimethoxy-5-fluoropyrimidine,
2-methoxy-4-methylthio-5-fluoropyrimidine,
2,4-dimethoxy-5-methylpyrimidine, or
2,4-diethoxy-5-trifluoromethylpyrimidine, the corresponding 4-substituted or 4,5-disubstituted pyrimidinone arabinoside is obtained.

Similarly, when the foregoing procedure is repeated using an equivalent amount of 2,3,5-tri-O-benzyl-D-arabinofuranosyl bromide in place of the chloride, similar results are obtained.

Additionally, using ethylene chloride, benzene, toluene, xylene, hexane, heptane, tetrahydrofuran, or dimethyl ether as solvents in the above procedure in place of methylene chloride, results in no significant change in yield.

The following experiment is presented for purposes of showing the production of a significant amount of by-product when the halo sugar and the pyrimidine are reacted at elevated temperatures in the absence of a solvent.

A condensation at elevated temperature without solvent is carried out using 2,4-dimethoxypyrimidine and 2,3,5-tri-O-benzyl-D-arabinofuranosyl chloride. The mixture is heated at 100° C. in an oil bath for 30 hours. The crude reaction mixture is chromatographed on a column of acid-washed alumina using ethyl acetate as the eluent. In addition to the desired product, a second, faster-running compound is obtained which amounts to approximately 25% of the product, $[\alpha]_D^{25}+34°$ (dichloromethane, c. 2.0), ultraviolet absorption of $\lambda_{max.}^{MeOH}$ 264; 208 mμ, $\epsilon$ 152; 612

This by-product is not obtained when a solvent system is employed and the condensation is effected at the lower temperatures as described previously.

*Example 2.—1-(2',3',5'-tri-O-benzyl-β-D-arabinofuranosyl)-4-amino-2(1H)-pyrimidinone (III)*

The crude condensation mixture (39 g.) of Example 1 is transferred to a large tube with 190 ml. of anhydrous methanol to which 190 ml. of concentrated ammonium hydroxide is added. The tube is sealed and heated at 100° C. for 17 hours in a bomb.

After the vessel is opened, the crystalline product is separated from the reaction mixture by filtration. The ammonolysis by-product from the excess dimethoxy pyrimidine remains in the filtrate.

Recrystallization from 225 ml. of hot ethyl acetate affords 19 g. (68%) of the desired product, M.P. 153–4° C., $[\alpha]_D^{24}+123°$ (methylene chloride, c. 2.0). Ultraviolet absorption data:

$\lambda_{max.}^{MeOH}$ 272.5, 232.5 mμ ($\epsilon$ 8,635, 7,504), $\lambda_{min.}$ 254 mμ

*Analysis.*—Calc. for $C_{30}H_{31}O_5N_3$: C, 70.16; H, 6.08; N, 8.18. Found: C, 70.24; H, 5.92; N, 8.33.

When an equivalent amount of anhydrous ammonia is substituted for ammonium hydroxide in the foregoing procedure, essentially the same yield of the 4-amino product is obtained.

Similarly, when there is substituted for the ammonia, or ammonium hydroxide in the above procedure, an equivalent amount of methylamine, ethylamine, propylamine, dimethylamine, diethylamine, or dipropylamine, the corresponding 4-methylamino-, 4-ethylamino-, 4-propylamino-, 4-dimethylamino-, 4-diethylamino-, or 4-dipropylamino-2(1H)-pyrimidinone arabinoside is obtained.

Additionally, the above procedure yields the corresponding 5-substituted-2(1H)-pyrimidinones when equivalent amounts of the 5-substituted products of Example 1 are used, in the foregoing procedure, in place of 1-(2',3',5'-tri-O-benzyl-β-D-arabinofuranosyl)-4-methoxy-2-(1H)-pyrimidinone, except that when 1-(2',3',5'-tri-O-benzyl-β-D-arabinofuranosyl)-4-methoxy-5-trifluoromethyl-2(1H)-pyrimidinone is used there is obtained, in addition to the 4-aminated-5-trifluoromethyl compound, 1-(2',3',5'-tri-O-benzyl-β-D-arabinofuranosyl)-4-amino-5-cyano-2(1H)-pyrimidinone, confirmed to be such by elemental analysis and ultraviolet and infrared spectra.

*Example 3.—1-β-D-arabinofuranosyl-4-amino-2(1H)-pyrimidinone (cytosine arabinoside) (IV)*

5.0 g. of palladium chloride suspended in 1000 ml. of anhydrous methanol is reduced to palladium with hydrogen at room temperature, and 5.14 g. (0.01 m.) of thoroughly dried 1-(2',3',5'-tri-O-benzyl-β-D-arabinofuranosyl)-4-amino-2(1H)-pyrimidinone dissolved in 100 ml. of methanol is added thereto. Hydrogen is introduced to the mixture and in 11 minutes the theoretical amount of hydrogen is absorbed by the acidic solution. The catalyst is removed by filtration and the filtrate is stirred with 125 ml. of Dowex 2-X8 (polystyrene dimethyl ethanol benzyl ammonium anion exchange resin) on the bicarbonate cycle. The resin is then filtered from the neutral solution, and the solvent is removed in vacuo.

The crystalline product is dissolved in water and filtered in order to remove contaminating colored impurities. After concentration to near dryness in vacuo, the cytosine arabinoside crystallizes spontaneously and is filtered with the aid of 15 ml. of ethanol, M.P. 212–213° C., 1.96 g., 80%, $[\alpha]_D^{24}$+153° (water, c. 0.5). (Lit., M.P. 212–213°, $[\alpha]_D$+158°).

*Analysis.*—Calc. for $C_9H_{13}O_5N_3$: C, 44.44; H, 5.39; N, 17.28. Found: C, 44.85; H, 5.41; N, 17.35.

When the 1-(2',3',5'-tri-O-benzyl-β-D-arabinofuranosyl)-4-amino-2(1H)-pyrimidinone in the foregoing procedure is replaced with equivalent amounts of 1-(2',3',5'-tri-O-benzyl-β-D-arabinofuranosyl)-4-amino-5-trifluoromethyl-2(1H)-pyrimidinone, 1-(2',3',5'-tri-O-benzyl-β-D-arabinofuranosyl)-4-amino-5-cyano-2(1H)-pyrimidinone, 1-(2',3',5'-tri-O-benzyl-β-D-arabinofuranosyl)-4-oxo-2(1H)-pyrimidinone, 1-(2',3',5'-tri-O-benzyl-β-D-arabinofuranosyl)-4-oxo-5-trifluoromethyl-2(1H)-pyrimidinone, 1-(2',3',5'-tri-O-benzyl-β-D-arabinofuranosyl)-4-methylamino-2(1H)-pyrimidinone, 1-(2',3',5'-tri-O-benzyl-β-D-arabinofuranosyl)-4-methylamino-5-trifluoromethyl-2(1H)-pyrimidinone, or 1-(2',3',5'-tri-O-benzyl-β-D-arabinofuranosyl)-4-dimethylamino-2(1H)-pyrimidinone, the corresponding 1-β-D-arabinofuranosyl-4-substituted- or 4,5-disubstituted-pyrimidinone is obtained.

*Example 4.—4-N-acetyl-1-(2',3',5'-tri-O-benzyl-β-D-arabinofuranosyl)-cytosine (V)*

Syrupy 2,3,5-tri-O-benzyl-D-arabinofuranosyl chloride (4.39 g., 0.01 m.) is dissolved in 65 ml. of freshly distilled toluene and added in two portions to a refluxing suspension of thoroughly dried N-acetylcytosine-mercury in 100 ml. of toluene. Just before adding the chloride, the suspension is dried by azeotropic distillation of solvent (30 ml.) from 130 ml. of toluene and the N-acetylcytosinemercury, 1.76 g. (0.005 m.), contained in the reaction flask. A clear solution is obtained after the mixture is refluxed with vigorous stirring for thirty minutes. After cooling, the solution is poured into 500 ml. of petroleum ether and allowed to stand overnight in a refrigerator at 5° C.

Since crystallization does not occur, the solution is concentrated in vacuo to a thin syrup, which is dissolved in 200 ml. of chloroform, washed with 25 ml. of 30% potassium iodide, 25 ml. of water, dried over magnesium sulfate, and reconcentrated to give 5.18 g. of a crude syrup. The product is shown to be a mixture by thin layer chromatography, and it is chromatographed and separated on 250 g. of silica gel using a 50% ethyl acetate-benzene solvent system. One large fraction (3.0 g.) and several trace fractions are eluted from the column before the desired product, 4-N-acetyl-1-(2',3',5'-tri-O-benzyl-β-D-arabinofuranosyl)-cytosine, is recevered as a syrup (0.80 g.)

$\lambda_{max}^{MeOH}$ 300, 248 mμ (ε 7,334; 14,168), $\lambda_{min.}$ 273.5 mμ

*Analysis.*—Calc. for $C_{32}H_{33}O_6N_3$: C, 69.17; H, 5.98; N, 7.56. Found: C, 68.77; H, 5.80; N, 7.36.

Similar results are obtained when equivalent amounts of the mercury complex of 4-acetyl-amino-5-tri-fluoromethyl-2(1H)-pyrimidinone are substituted for 4-acetyl-amino-2(1H)-pyrimidinone-mercury in the foregoing procedure.

*Example 5.—1-(2',3',5'-tri-O-benzyl-β-D-arabinofuranosyl)-4-amino-2(1H)-pyrimidinone (III)*

Purified 1-(2',3',5'-tri-O-benzyl-β-D-arabino-furanosyl)-4-acetylamino-2(1H)pyrimidinone (0.80 g., 0.144 mM.) is dissolved in 8 ml. of ethanol, then 3.1 ml. of 1 N sodium hydroxide is added and the mixture is heated with stirring at 70–80° C. for thirty minutes.

When the solution cools, the product is extracted with chloroform, dried over magnesium sulfate, and the solvent is removed. The residue is crystallized twice from ethyl acetate yielding 325 mg., 44%, of 1-(2',3',5'-tri-O-benzyl-β-D-arabinofuranosyl)-4-amino-2(1H)-pyrimidinone, M.P. 148–151° C., $[\alpha]_D^{23}$+117.9° (dichloromethane, c. 2.0).

*Analysis.*—Calc. for $C_{30}H_{31}O_5N_3$: C, 70.16; H, 6.08; N, 8.18. Found: C, 69.83; H, 6.10; N, 8.27.

*Example 6.—1-β-arabinofuranosyl-4-amino-2(1H)-pyrimidinone (cytosine arabinoside) (IV)*

120 mg. of palladium chloride suspended in 75 ml. of anhydrous methanol is reduced to palladium with hydrogen at room temperature, then 150 mg. of 1-(2',3',5'-tri-O-benzyl-β-D-arabinofuranosyl)-4-amino-2(1H)-pyrimidinone dissolved in 25 ml. of dry methanol is added to the suspension. The mixture is hydrogenated, with sacking, at room temperature until the theoretical amount of hydrogen is taken up. After removal of the catalyst by filtration, the acidic solution is passed through a column containing 6 ml. of Dowex 2-X8 (HCO$_3^-$) ion exchange resin and the neutral eluent is concentrated in vacuo. Purified starting material, 100 mg., is recovered with a higher melting point, 154–156° C.

The hydrogenolysis is successfully repeated using 100 mg. of palladium chloride suspended in 20 ml. of dry methanol as described above, except the hydrogenation is allowed to proceed for 24 hours to absorb the theoretical amount of hydrogen, 13.2 ml.

The product is worked up as described in Example 3, dissolved in hot 50% aqueous methanol, and filtered in order to remove an insoluble material which gives a residue upon ignition that is alkaline to moist alkacid paper. After removal of the solvent in vacuo, the hard glass is crystallized by trituration with a small amount of ethanol, 23 mg., 50% M.P. 212–213° C., $[\alpha]_D^{24}$+129° (water, c. 0.5).

*Analysis.*—Calc. for $C_9H_{13}O_5N_3$: C, 44.44; H, 5.39; N, 17.28. Found: C, 43.53; H, 5.01; N, 16.57.

*Example 7.—1-(2,3,5-tri-O-benzyl-β-D-arabinosyl)-4-methylthiopyrimidinone (VI)*

To a stirred suspension of 0.131 g. of a 50% emulsion of sodium hydride in mineral oil (2.8 mM.) in 15 ml. of dry dimethylformamide is added 0.403 g. (2.8 mM.) of 4-methylthiopyrimidine-2-one. A solution of 1.2 g. (2.8 mM.) of 2,3,5-tri-O-benzyl-D-arabinosyl chloride in 10 ml. of dimethylformamide is added, and the mixture stirred at room temperature for 18 hours. The mixture is treated with 100 ml. of cold water and extracted with ether. The ether solution is washed with water, dried over magnesium sulfate, and concentrated to a yellow oil, weight 1.43 g. Chromatography on 50 g. of silica gel furnishes 1.34 g. in one peak, eluted with ether.

*Example 8.—1-(2,3,5-tri-O-benzyl-β-arabinosyl)-4-aminopyrimidinone (III)*

A mixture of 120 mg. of the 4-methylthio compound (VI) obtained in Example 7, 15 ml. of methanol, and 15 ml. of liquid ammonia is heated in a bomb at 100° C. for 12 hours. After evaporation of the solvent, the residue is triturated with ether-ethyl acetate, and then recrystallized from ethyl acetate to obtain 10.5 mg. of product M.P. 150–155°, not depressed when mixed with a specimen prepared from 1 - (2′,3′,5′ - tri - O - benzyl - β - D-arabinofuranosyl) - 4 - methoxy - 2(1H) - pyrimidinone. The infrared spectra (Nujol mull) of the two samples is identical.

*Example 9.—2,4-dichloro-5-trifluoromethylpyrimidine*

To 5.0 g. (0.0277 m.) of 5-trifluoromethyluracil suspended in 20 ml. of phosphorous oxychloride, 4.9 g. of N,N,-diethylaniline is added. The mixture is heated at reflux in an oil bath for 23 hours, cooled, concentrated to 10 ml. in vacuo, and poured into 20 g. of ice. After vigorous agitation to complete the decomposition of excess phosphorous oxychloride, the mixture is extracted four times with 50 ml. portions of ether, which are combined and washed successively with 30 ml. of sodium bicarbonate and 20 ml. of water. The ether solution is dried over calcium chloride and concentrated by distillation through an 18-inch Vigreaux column at atmospheric pressure. The last 10 ml. is removed carefully in vacuo. Distillation at slightly reduced pressure yields 3.5 g. (58%) of a light yellow oil, B.P. 126°/650 mm.

$\lambda_{max.}^{MeOH}$ 266, 213 m$\mu$ ($\epsilon$ 2,452; 9,309), $\lambda_{min.}$ 237 m$\mu$

*Analysis.*—Calc. for $C_7H_7O_2N_2F_3$: C, 40.39; H, 3.39; Cl, 32.67; F, 26.27. Found: C, 28.57; H, 0.58; Cl, 32.62; F, 27.7

This material is used without further purification.

*Example 10.—2,4,dimethoxy-5-trifluoromethylpyrimidine*

A solution of 2,4 - dichloro - 5 - trifluoromethylpyrimidine, 3.16 g. (0.0145 m.) in 7 ml. of anhydrous methanol is added dropwise to a stirred solution of sodium methoxide, 1.57 g. (0.0290 m.), dissolved in 10 ml. of methanol. Sodium chloride immediately separates from the solution which becomes warm as the addition is made. After stirring the suspension for 30 minutes longer, the sodium chloride is filtered off (99% yield), and the filtrate is concentrated to 10 ml. by distilling the solvent through a Vigreaux column at atmospheric pressure. The residue is dissolved in 60 ml. of ether, washed with 7 ml. of 20% sodium hydroxide, 7 ml. of water, and dried over sodium sulfate. The solvent is removed by distillation through a Vigreaux column, the last of the solvent being removed carefully under slight vacuum. The residual solid is recrystallized by dissolving in a minimum amount of petroleum ether and chiling the solution in Dry Ice, yield 2.90 g. (96%), M.P. 55–56°

$\lambda_{max.}^{MeOH}$ 257, 216 m$\mu$ ($\epsilon$ 5,366; 9,817), $\lambda_{min.}$ 236.5 m$\mu$

*Anaylsis.*—Calc. for $C_7H_7O_2N_2F_3$: C, 40.39; H, 3.39; N, 13.45; F, 27.39. Found: C, 40.89; H, 3.06; N, 13.29; F, 25.31.

The corresponding dialkoxy compound is obtained in the foregoing procedure when sodium or potassium ethoxide, propoxide, or butoxide are employed in place of sodium methoxide.

*Example 11.—1 - (2′,3′,5′ - tri - O - benzyl - β - D-arabinofuranosyl) - 4 - methoxy - 5 - trifluoromethyl-2(1H)-pyrimidinone*

Methylene chloride (80 ml.), which has been dried over magnesium sulfate, is filtered directly into a dry flask containing 5.60 g. (0.0128 m.) of 2′,3′,5′ - tri - O-benzylarabinofuranosyl chloride. A solution of 2,4-dimethoxy - 5 - trifluoromethylpyrimidine (2.66 g., 0.0128 m.) in 20 ml. of methylene chloride is dried over sodium sulfate and filtered directly into the reaction vessel. The solution is stirred gently for three days at room temperature, protected by a drying tube. After removal of solvent, the crude product, 7.5 g. (quant.), is used without purification in the following example.

*Example 12.—1-β-D-arabinofuranosyl-4-methoxy-5-trifluoromethyl-2(1H)-pyrimidinone*

Two grams of the crude condensation product is dissolved in 90 ml. of dry methanol (molecular sieves) and added to two grams of palladium chloride which has been suspended and pre-reduced in 60 ml. of anhydrous methanol. The theoretical hydrogen absorption is observed after three minutes shaking at room temperature. After removal of the catalyst by filtration, the acidic solution is neutralized batchwise with Dowex 2–X8 ($HCO_3^-$) and filtered. When the solvent is removed in vacuo spontaneous crystallization occurs. The product is trituated with water, filtered, and washed several times in order to remove contaminant arabinofuranose. Recrystallization is accomplished by dissolving in the minimum amount of methanol, adding an equal volume of ether and excess hexane, yield 0.720 g. (66%) of pure product, M.P. 184–186° $[\alpha]_D + 133.4°$, (c. 0.5 MeOH). Ultraviolet spectra: pH 2, $\lambda_{max.}$ 270, 205 m$\mu$, ($\epsilon$ 5,933; 18,006), $\lambda_{min.}$ 238 m$\mu$, pH 12, $\lambda_{max.}$ 278, 217 m$\mu$ ($\epsilon$ 6,390; 12,812), inflection 225 m$\mu$ ($\epsilon$ 12,290), $\lambda_{min.}$ 255 m$\mu$.

*Analysis.*—Calc. for $C_{11}H_{13}O_6N_2F_3$: C, 40.50; H, 4.02; N, 8.58; F, 17.47. Found: C, 40.68; H, 3.80; N, 8.52; F, 17.3.

*Example 13.—5-trifluoromethyl-1-β-D-arabinofuranosyluracil*

To 5 ml. of 1.1 N methanolic hydrogen chloride 160 mg. of 1 - β - D - arabinofuranosyl - 4 - methoxy - 5-trifluoromethyl - 2(1H) - pyrimidinone is added. The solution, in a tightly stoppered flask, is kept at room temperature for three days. After concentration in vacuo, the residue is dissolved in a minimum amount of methanol, diluted with ether, and crystallized by addition of hexane. After one recrystallization 125 mg., 82% of the pure product is obtained, M.P. 225–227°, $[\alpha]_D + 76°$ (c. 0.5 $H_2O$). Ultraviolet spectra: pH 2, $\lambda_{max.}$ 262.5, 205 m$\mu$ ($\epsilon$ 10,296; 8,923), $\lambda_{min.}$ 228 m$\mu$, pH 12, immediately after dissolving: $\lambda_{max.}$ 262.5 m$\mu$ ($\epsilon$ 7,020); $\lambda_{min.}$ 241 m$\mu$, after one hour: $\lambda_{max.}$ 267 m$\mu$ ($\epsilon$ 7,238); $\lambda_{min.}$ 247.5 m$\mu$, after 24 hours: $\lambda_{max.}$ 272 m$\mu$ ($\epsilon$ 8,170); $\lambda_{min.}$ 249.5 m$\mu$.

*Analysis.*—Calc. for $C_{10}H_{11}O_6N_2F_3$: C, 38.47; H, 3.55; N, 8.89; F, 18.25. Found: C, 38.11; H, 3.81; N, 8.80; F, 19.4.

Any departure from the above description which conforms to the present invention is intended to be included within the scope of the claims.

What is claimed is:

1. The process for producing compounds of the formula

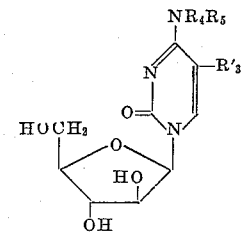

wherein $R'_3$ is selected from the group consisting of hydrogen, alkyl, halogen, halogenated alkyl, and cyano, and $R_4$ and $R_5$ are selected from the group consisting of hydrogen and alkyl, provided that when $R'_3$ is cyano, $R_4$ and R₅ are hydrogen, which comprises reacting a halo arabinoside of the formula

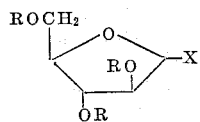

wherein R is an aralkyl group and X is a halogen, with a pyrimidine of the formula

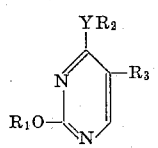

wherein R₁ and R₂ are alkyl, R₃ is selected from the group consisting of hydrogen, alkyl, halogen, and halogenated alkyl, and Y is selected from the group consisting of oxygen and sulfur, at a temperature of between 0 and 70° C. and in the presence of an inert solvent thereby to form a β nucleoside of the formula

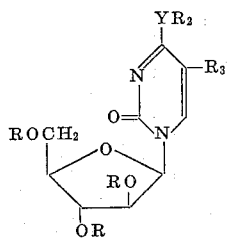

wherein R, R₂, R₃, and Y are as defined above, treating said β nucleoside with an aminating agent to produce an aminated compound of the formula

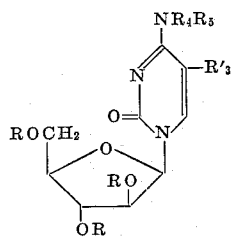

wherein R, R′₃, R₄, and R₅ are as defined above, and treating said aminated product with hydrogen in the presence of a catalyst thereby to form a dearalkylated compound of the formula

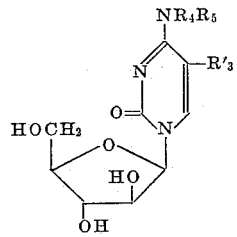

wherein R′₃, R₄, and R₅ are as defined above.

2. The process according to claim 1 wherein the halo arabinoside is 1-(2′,3′,5′-tri-O-benzyl - D - arabinosbyl) chloride.

3. The process according to claim 1 wherein the pyrimidine is 2,4-dimethoxypyrimidine.

4. The process according to claim 1 wherein the pyrimidine is 2,4-dimethoxy-5-trifluoromethylpyrimidine.

5. The process according to claim 1 wherein the halo arabinoside is 2,3,5-tri-O-benzyl-D-arabinofuranosylchloride, the solvent is selected from the group consisting of halogenated aliphatic compounds, aliphatic compounds, aromatic compounds, ethers, and esters, the aminating agent is ammona, and the reducing system comprises hydrogen and a palladium catalyst, thereby to produce a compound of the formula

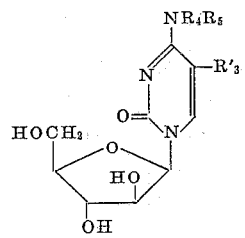

wherein R′₃ is as defined in claim 1, and R₄ and k₅ are hydrogen.

6. The process for producing 1-β-D-arabinofuranosyl-4-amino-2(1H)-pyrimidinone which comprises reacting together 2,3,5 - tri-O-benzyl-D-arabinofuranosylchloride with 2,4-dimethoxypyrimidine in the presence of a hydrogenated aliphatic solvent and at a temperature of between 0 and 70° C., thereby to form 1-(2′,3′,5′-tri-O-benzyl-β-D - arabinofuranosyl) - 4-methoxy-2(1H)-pyrimidinone, treating said compound with liquid ammonia to produce 1 - (2′,3′,5′-tri-O-benzyl-β-D-arabinofuranosyl)-4-amino-2(1H)-pyrimidinone, and contacting said compound with hydrogen in the presence of a palladium catalyst to form said 1 - β - D-arabinofuranosyl-4-amino-2(1H)-pyrimidinone.

7. The process for producing a β nucleoside of the formula

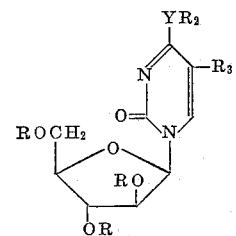

wherein R is an aralkyl group, R₂ is alkyl, R₃ is selected from the group consisting of hydrogen, alkyl, halogen, and halogenated alkyl, and Y is selected from the group consisting of oxygen and sulfur, which comprises reacting together a halo arabinoside of the formula

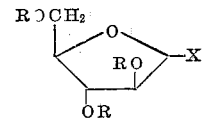

wherein R is as previously defined and X is a halogen, with a pyrimidine of the formula

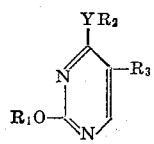

wherein R₁ is alkyl, R₂, R₃, and Y are as previously defined, at a temperature of between 0 and 70° C., and in the presence of a solvent.

8. The process according to claim 7 wherein the solvent is selected from the group consisting of halogenated aliphatics, alkanes, esters, ethers, and aromatic solvents.

9. The process according to claim 7 wherein X is chloro and R₃ is hydrogen.

10. The process according to claim 7 wherein X is chloro, R is benzyl, R₁ is methyl, R₂ is methyl, and R₃ is trifluoromethyl.

11. 2,4-dimethoxy-5-trifluoromethylpyrimidine.
12. Compounds of the formula

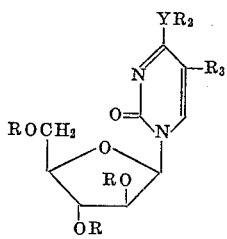

wherein R is an aralkyl group, $R_2$ is alkyl, $R_3$ is selected from the group consisting of halogen, halogenated alkyl, and alkyl, and Y is selected from the group consisting of oxygen and sulfur.

13. 1 - (2',3',5' - tri - O-benzyl-β-D-arabinofuranosyl)-4-methoxy-5-trifluoromethyl-2(1H)-pyrimidinone.
14. Compounds of the formula

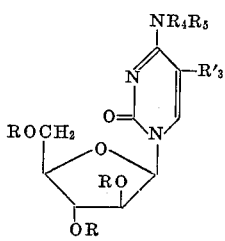

wherein R is an aralkyl group, $R_4$ and $R_5$ are selected from the group consisting of hydrogen and alkyl, and $R'_3$ is selected from the group consisting of halogen, alkyl, halogenated alkyl, and cyano, provided that when $R'_3$ is cyano $R_4$ and $R_5$ are hydrogen.

15. The compound according to claim 14 wherein $R'_3$ is trifluoromethyl or cyano.
16. 1 - (2',3',5' - tri - O-benzyl-β-D-arabinofuranosyl)-4-amino-5-$R'_3$-2(1H)-pyrimidinone wherein $R'_3$ is trifluoromethyl or cyano.
17. Compounds of the formula

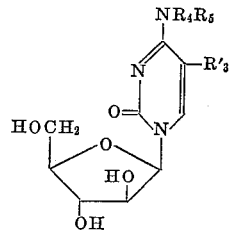

wherein $R_4$ and $R_5$ are selected from the group consisting of hydrogen and alkyl, and $R'_3$ is selected from the group consisting of halogen, halogenated alkyl, and cyano, provided that when $R'_3$ is cyano, $R_4$ and $R_5$ are hydrogen.

18. 1 - β - D - arabinofuranosyl-4-amino-5-$R'_3$-2(1H)-pyrimidinone wherein $R'_3$ is trifluoromethyl or cyano.
19. 1 - β - D - arabinofuranosyl - 4-oxo-5-trifluoromethyl-2(1H)-pyrimidinone.

References Cited
UNITED STATES PATENTS

| | | | |
|---|---|---|---|
| 2,885,396 | 5/1959 | Heidelberger et al. | 260—211.5 |
| 2,949,451 | 8/1960 | Hoffer | 260—211.5 |
| 3,040,026 | 6/1962 | Duschinsky | 260—211.5 |
| 3,135,737 | 6/1964 | Restivo | 260—211.5 |

LEWIS GOTTS, *Primary Examiner.*

JOHNNIE R. BROWN, *Assistant Examiner.*